United States Patent Office 2,808,457
Patented Oct. 1, 1957

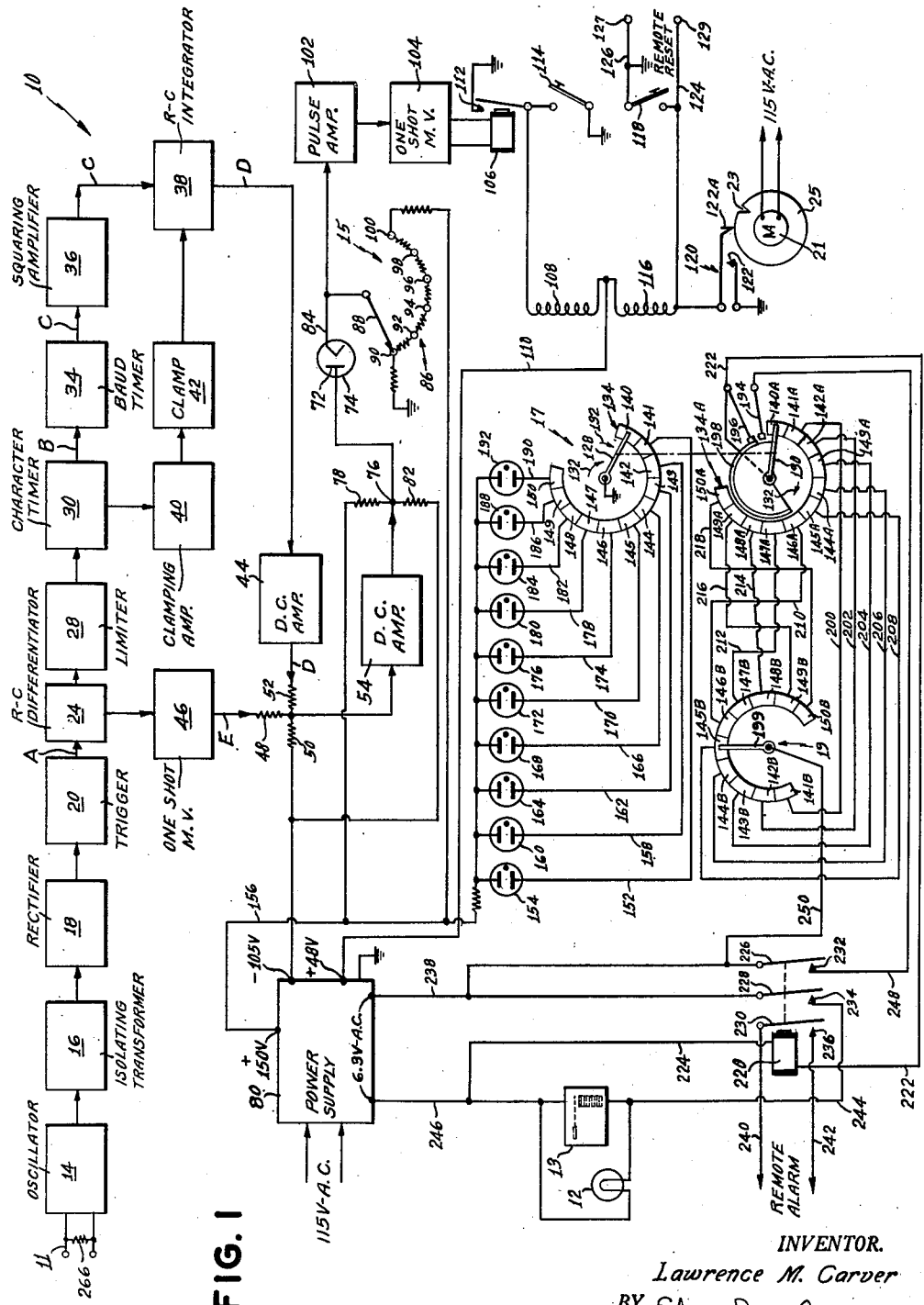
FIG. I
INVENTOR.
Lawrence M. Carver
BY
ATTORNEYS

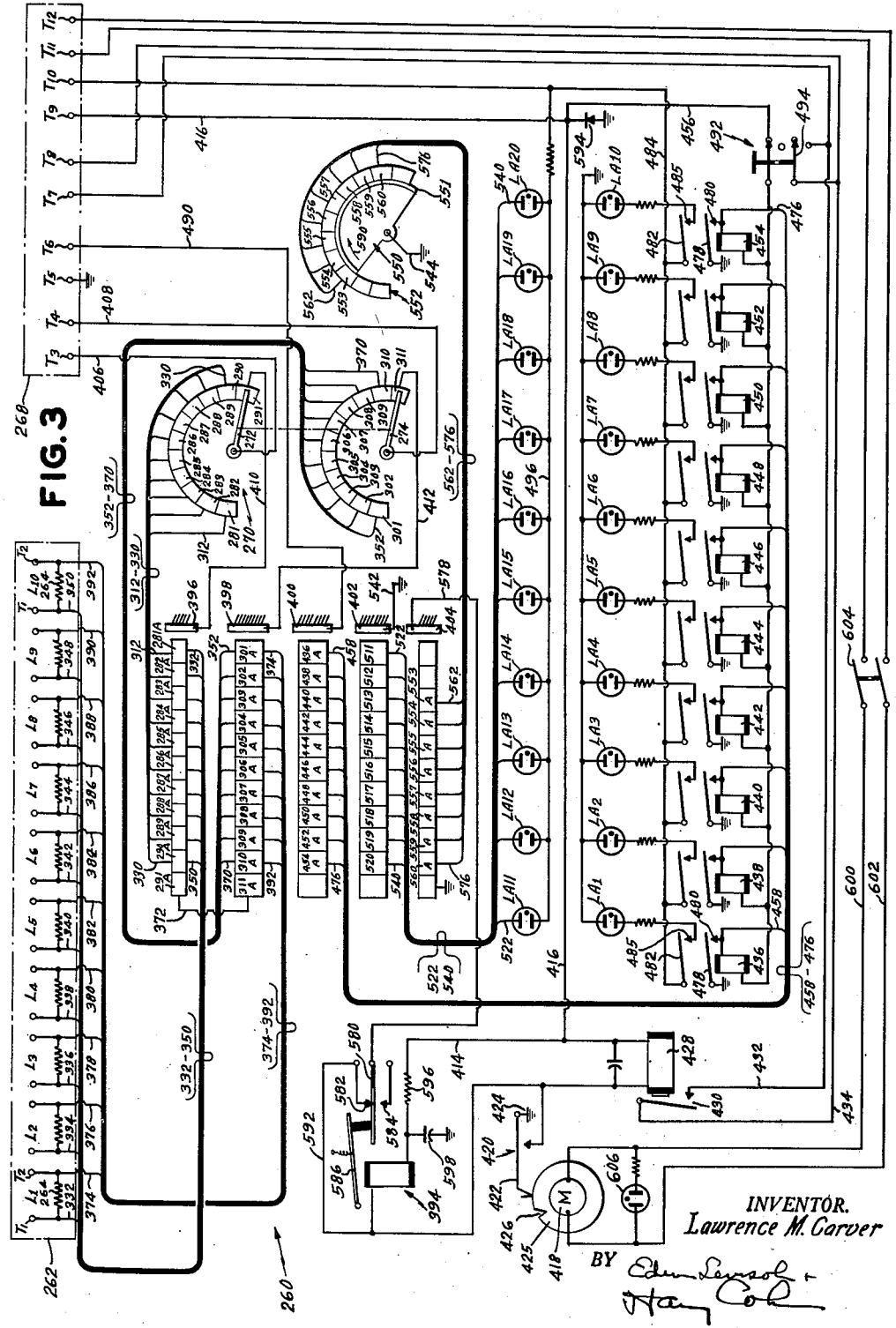

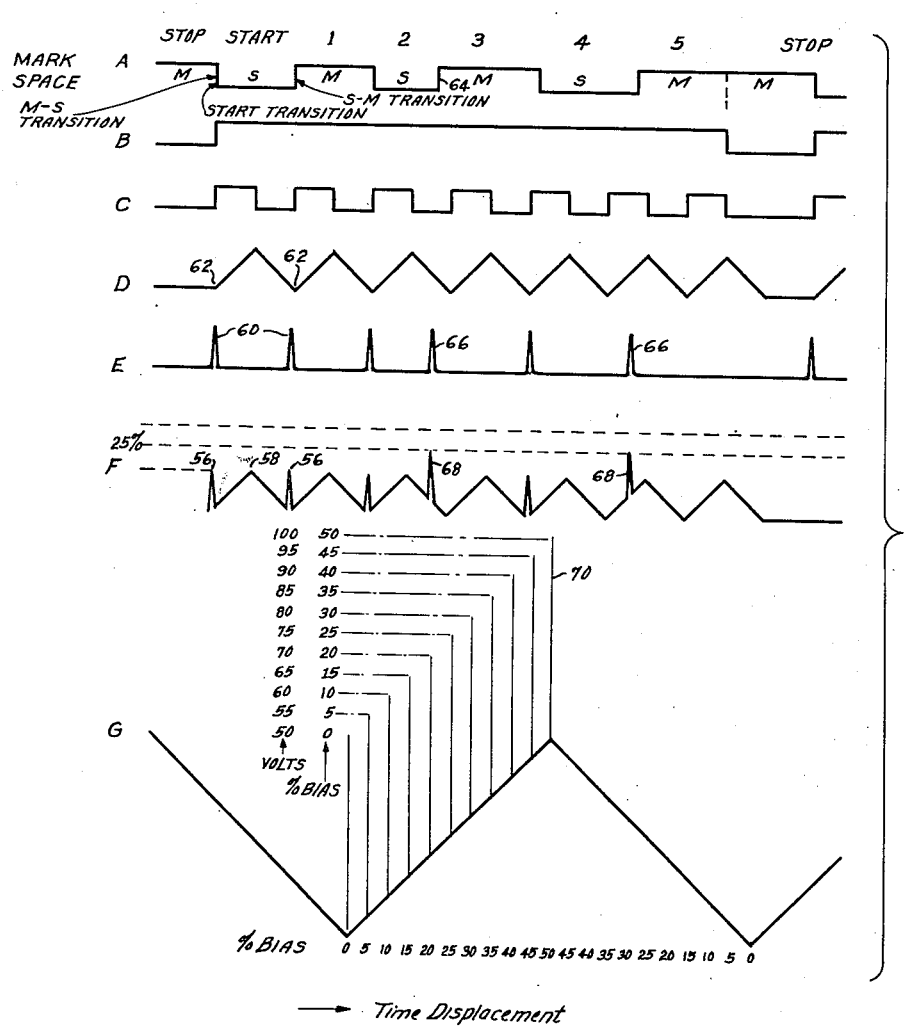

2,808,457
APPARATUS FOR MONITORING A PLURALITY OF TELEGRAPH LOOPS

Lawrence M. Carver, Springdale, Conn., assignor to Stelma, Inc., Stamford, Conn., a corporation of Connecticut Application February 24, 1956, Serial No. 567,662

8 Claims. (Cl. 178—69)

The present invention relates to telegraph monitoring apparatus.

The primary object of the present invention is the provision of means to provide for the sequential monitoring of a plurality of telegraph circuits utilizing only one telegraph monitor.

Another object is the provision of means to select or to change the number of telegraph circuits which are sequentially monitored by the same telegraph monitoring apparatus.

Another object is the provision of a warning system in a sequential monitoring arrangement for several telegraph circuits utilizing only one telegraph monitor, wherein an alarm device is energized when the circuit being monitored has a predetermined distortion count and said alarm device remains energized after the monitoring apparatus has been switched to monitor another telegraph circuit.

A further object is the provision of means for indicating the particular telegraph circuit which is being monitored.

The above and other objects, features and advantages of the present invention will be more fully understood from the following description considered in connection with the accompanying illustrative drawings.

In the drawings which illustrate the best mode presently contemplated on carrying out the invention:

Fig. 1 is a combined block diagram and schematic of a telegraph monitoring apparatus of the type utilized with the present invention;

Fig. 2 is a wave form chart indicating the wave forms at various points in the telegraph monitor; and Fig. 3 is a schematic illustration of a switching device pursuant to the present invention.

Referring now to Figure 1 of the drawings in detail, there is illustrated a conventional telegraph monitoring apparatus of the type to which the present invention is applicable, said apparatus being indicated generally by the reference numeral 10. The apparatus 10 functions to monitor the signal quality within a telegraph circuit and causes an alarm to be energized when the distortion present in the signal transmitted through the telegraph circuit deteriorates to what may be considered an unusable level. The necessary steps may then be taken to improve the telegraph circuit before considerably bad copy has been printed by the teleprinter to which the telegraph circuit is electrically connected. In this connection, it will be understood that the monitor 10 is used only for monitoring automatically formed teleprinter signals and not for Morse code signals.

Briefly described, the input circuit 11 of the monitor apparatus 10 is connected into a telegraph loop circuit and when the distortion present in the input signal received from the telegraph loop circuit exceeds predetermined limits, as preset by various settings or adjustments of the mointor apparatus 10, a visual alarm 12 and an audible alarm 13 are energized. There are three factors of adjustment present within the monitor apparatus which determine when the alarm devices 12 and 13 will be energized by distortion present in the input signal. The first is a distortion threshold control 15 which may be adjusted to various values or percentages of distortion present in the input signal from the telegraph loop circuit. Each time the input signal contains an amount of distortion which exceeds the value preset by the control 15, a counter 17 is activated to cause a sequential count. The second factor of adjustment present within the monitor is a hit-count-to-alarm switch 19 which is preset to a predetermined sequential count so that when the sequential count reaches the value preset by switch 19, the alarm devices 12 and 13 are energized. The third factor of adjustment within the monitor is a timing motor 21 which allows the number of hit counts to sequentially accumulate during the cycle of operation of the timing motor. At the end of the operating cycle of the timing motor, the counter 17 is reset to its starting or zero position. If a sufficient count is not accumulated during the timing interval, as preset by the switch 19 to energize the alarm devices 12 and 13, these devices remain denergized. A typical operating cycle for the timing motor 21 is ten minutes.

The signal at the input circuit 11 is applied to an oscillator 14. The signal output of the oscillator 14 is applied to an isolating transformer 16 which couples the signal to a rectifier stage 18. The rectifier serves to restore the signal to a D. C. voltage. The output from the rectifier stage 18 is applied to a trigger stage 20 to provide a uniform square wave signal at the output of the trigger stage. The signal voltage appearing at the output of the trigger stage 20 is differentiated at an RC differentiator 24 and the differentiated output is applied to a limiter stage 28, which passes only positive pulses and thereby suppresses the negative pulses which may adversely affect the timing of a character timer or Baud timer gate stage 30. The character timer or gating stage 30 operates a Baud timer stage 34 to produce one cycle of square wave output from the stage 34 corresponding to each Baud of input signal. Since the output of the Baud timer stage 34 is not a perfect square wave, provision is made for supplying the output of the Baud timer stage to a squaring amplifier stage 36 so as to provide a perfect square wave signal output. The output of the squaring amplifier 36 is applied to an RC integrator 38. In order to secure a proper saw tooth wave form output from the RC integrator 38, provision is made for a clamping circuit constituted by a clamping amplifier stage 40, which is connected to the output of the character timer 30, and the clamp stage 42, which is connected to the output of the amplifier 40. The peak voltage output of the RC integrator 38 is amplified by the D. C. amplifier stage 44.

The stages 14, 16, 18, 20, 28, 30, 34, 36, 38, 40, 42, 44, the differentiator 24 and the integrator 38, are the same as the similarly numbered stages or components in my prior Patent No. 2,712,038 dated June 28, 1955 and assigned to the assignee hereof. Said stages and components are illustrated and described in detail in said prior patent and it will be understood that they function in the same manner as the similarly numbered components in said prior patent. Furthermore, it will be noted that the wave forms illustrated in lines A, B, C and D of Figure 2 herein, which are taken at the similarly designated points in Fig. 1, correspond to the wave forms illustrated in lines A, F, G and H of Figure 2 of my prior patent. The only difference is that some distortion is shown on the signal in line A of Figure 2 herein, which was not shown on the signal in said prior patent.

In addition to the foregoing stages, the telegraph monitor 10 includes a one-shot or start-stop multivibrator 46 having very short output pulse duration. The output of the RC differentiator 24 is fed in parallel, output therefrom being applied to the limiter 28, as previously described, and in addition to the multivibrator 46, the circuit of which is arranged so that positive (space-mark) or negative (mark-space) transitions driving the input of the multivibrator 46 result in positive pulses at its output. Line E in Figure 2 illustrates the output pulses of stage 46. The saw tooth voltage output of the amplifier stage 44, indicated in line D of Figure 2, is combined with the positive pulses constituting the output of the multivibrator 46, across the resistors 48, 50 and 52 to produce a resultant signal as illustrated in line F of Figure 2. Resistors 48 and 50 are equalizing resistors which are set in value to regulate the relative amplitudes of the two signals being combined, the signals being summed across resistor 50. The signal developed across resistor 50 is amplified in the D. C. amplifier stage 54. Consequently, it will be apparent that the pulses in line E occur at the mark-space or M-S transitions and the space-mark or S-M transitions in the signal, as will be apparent from a comparison of lines A and E of Figure 2, line A representing the wave form for the character or letter Y of the Baudot code, which would appear at the signal input 11 when the letter Y is being transmitted over the telegraph loop, the saw tooth or sweep signal being combined with the positive transition pulses of line E in the resultant wave form in line F. It will be noted that the transitions, which occur where there is no bias distortion of the telegraph signals are of the same amplitude in the resultant signal in line F, as the peak amplitude of the sweep or saw tooth signal. This will be apparent from the peaks 56 in line F representative of the transition pulses and the peak 58 representative of the saw tooth signal. It will be apparent that where there is no distortion in the input signal, the transition pulses 60 in line E occur at the zero voltage level points 62 of the saw tooth signal in line D so that when the transition pulses are combined with the saw tooth wave form they appear at the points representative of zero voltage in the original saw tooth wave form with a result that the peak amplitude of the points 56 in the combined wave form F representative of the transition impulses 60 are equal in amplitude to the peak points 58 of the saw tooth wave form. However, where there is distortion present in the input signal, the transition pulse does not coincide with the zero voltage point on the saw tooth voltage wave form. For example, the space-mark transition indicated at 64 in line A will produce the pulse 66 in line E. By a comparison of lines E and D it will be noted that the pulse 66 in line E is not aligned on the time base with a point 62 in the saw tooth voltage signal in line D. Consequently, when the signals of lines D and E are added, the pulse 66 appears on a portion of the composite wave form in line F which is above the zero point in the latter, as indicated by the pulse 68 in line F, to produce a peak amplitude which is of greater value than the saw tooth wave form peaks. For example, the pulse indicated at 68 in line F is representative of a signal having 25 percent distortion. Consequently, it will be apparent that the net effect of combining the outputs of the D. C. amplifier 44 and the one shot multivibrator 46 is to permit the bias distortion in the signal, which is a change in time displacement in the signal, to appear as a change in voltage amplitude. This is fully illustrated in line G of Figure 2 for one sweep of the saw tooth wave form. In this line, the time displacement due to various percentages of bias distortion is illustrated on a horizontal scale. The comparable voltage amplitudes are indicated in a vertical direction along with the percentage of bias they represent. For example, a fifty volt amplitude of the saw tooth wave form in line G which represents the peak voltage of the saw tooth wave form is equivalent to no bias distortion. However, a peak voltage of one hundred volts, as at 70, is representative of fifty percent bias distortion.

The composite signal shown in line F of Figure 2 is applied to the plate 72 of a diode gate 74. More specifically, it will be noted that the plate 72 of tube 74 is connected to point 76 to which the output of the D. C. amplifier 54 is connected, said point also being connected through the resistor 78 to the high voltage point of the power supply and through the resistor 82 to the negative voltage supply of the power supply. The cathode 84 of the tube 74 is connected to the previously described distortion threshold control 15. More specifically, the control 15 is constituted by a calibrated voltage divider 86 which is connected between the high voltage point of the power supply 80 and ground. The movable tap 88 is connected to the cathode 84 and the values of the resistor elements constituting the voltage divider 86 are such that the points 90, 92, 94, 96, 98 and 100 thereof provide positive voltages of 70, 75, 80, 85, 90 and 95 volts respectively. The percentages of bias distortion corresponding to these voltage values may be readily ascertained from the table associated with the voltage wave form in line G of Figure 2. Assume now that the distortion threshold control 15 is adjusted so that the tap 88 is set at point 90 of the voltage divider 86, so as to provide a positive voltage of 70 volts on the cathode 84. Since twenty percent distortion represents a voltage of 70 volts, as indicated on the table in line G of Figure 2, any signal distortion below 20 percent will apply a peak pulse of less than 70 volts to the plate 72 of the tube 74. Under these circumstances, the diode 74 will not conduct and no signal will be developed in the cathode of the diode 74. However, if the signal distortion exceeds 20 percent so as to provide a pulse exceeding 70 volts on the plate 72, said pulse will exceed the cathode voltage of 70 volts so that tube 74 will conduct and the pulse applied to the plate 72 of tube 74 will appear at the cathode 84. Consequently, it will be apparent that for any setting of the distortion threshold control 15, when the signal having a percentage of distortion which exceeds that for which the control 15 is set, is applied to the plate of tube 74, the signal pulse will be developed in the cathode 84 of the tube. However, when the distortion contained in the signal is less than that for which the control 15 is set, the signal is not passed through the diode 74 and therefore does not appear in the cathode circuit thereof.

Where the percentage of the distortion present in the signal exceeds only slightly the setting of the distortion threshold control 15, the amplitude of the resulting pulse in the cathode circuit of the tube 74 will be quite small. Therefore, a pulse amplifier stage 102 is connected to the cathode or tube 74 to amplify the signal appearing in the cathode of said tube. Consequently, signals having distortions slightly exceeding the setting of the distortion threshold control 15 will now result in pulses at the output of the amplifier 102 which have sufficient amplitude to trigger stage 104 which is a one shot or start-stop multivibrator. The multivibrator 104 operates a relay 106. The multivibrator 104 is used to elongate the pulse from the amplifier 102 to a sufficient length to operate a stepping relay which functions as the previously identified counter 17, through the relay 106. The multivibrator would not normally handle enough current to operate the counter 17 directly.

The counter 17 comprises a stepping solenoid or coil 108 one end of which is connected through the line 110 to a positive potential point or tap on the power supply 80. The other end of the stepping relay 108 is connected to ground, either through the contact 112 of relay 106, when the latter is energized, or through a manual count switch 114 when the latter is closed. The counter 17 also includes a resetting coil or solenoid 116, one end of which is connected through the line 110 to the power supply, the other end being connected to ground through a manual reset switch 118 when the switch is closed, or through a timing switch 120 operated by the timing motor 21, when the latter closes the contacts 122 of the timing switch. The reset coil 116 is also connected through the leads 124 and 126 to a remote reset switch, as hereinafter described.

The stepping relay 108 operates the ganged movable contacts 128 and 130, which are sequentially stepped to advance in the direction of the arrows 132 upon energization of the relay 108. The sweep arm 128 makes successive contact with the contact segments of a ring 134, it being understood that the various segments are insulated from each other. These segments are indicated at 140, 141, 142, 143, 144, 145, 146, 147, 148, 149 and 150. The segment 140 represents the home or starting position for the sweep arm 128, each of the other segments being connected to a neon count indicator lamp. More specifically, it will be noted that the contact segment 141 is connected through lead 152 to the neon lamp indicator 154, which is connected to the high voltage line 156 from the power supply 80. The contact segment 142 is connected through the line 158 to the neon lamp indicator 160 which is connected to high voltage line 156. The contact segment 143 is connected through the lead 162 to the lamp 164 which is connected to the high voltage line 156. The contact segment 144 is connected through lead 166 to lamp 168 connected to high voltage line 156. The contact segment 145 is connected through line 170 to lamp 172 connected to line 156. Contact segment 146 is connected through lead 174 to lamp 176 connected to line 156. The contact segment 147 is connected through line 178 to lamp 180 connected to line 156. The contact segment 148 is connected by line 182 to lamp 184 connected to line 156. The contact segment 149 is connected through line 186 to lamp 188 connected to line 156 and the contact segment 150 is connected through line 190 to lamp 192 connected to line 156.

The sweep arm 130 moves sequentially along the contact segments of a corresponding contact ring 134A. Said ring has the contact segments 140A through 150A. It will be understood that the contact segments 140A through 150A are insulated from each other, the segment 140A representing the "off" or "home" position of the sweep arm 130. Provision is also made for the contacts 194 and 196 which are associated with the ring 134A. It will be noted that in the "off" position of the sweep arm 130, the contacts 194 and 196 are disengaged from each other but that in each of the other positions of the sweep arm 130, as the latter sequentially advances from the contact 140A to contact 150A, the contacts 194 and 196 are bridged by a conducting segment 198, which rotates with the sweep arm 130.

The previously identified hit-to-count alarm switch or selector 19 is provided with a manually operable sweep arm 199 which may be selectively engaged with any one of the contacts 141B through 150B, which contacts are electrically insulated from each other. It will be noted that contacts 141A and 141B are interconnected by line 200. Line 202 interconnects contacts 142A and 142B, line 204 interconnects contacts 143A and 143B. Line 206 interconnects contacts 144A and 144B. Line 208 interconnects contacts 145A and 145B. Line 210 interconnects contacts 146A and 146B. Line 212 interconnects contacts 147A and 147B. Line 214 interconnects contacts 148A and 148B. Line 216 interconnects contacts 149A and 149B, and line 218 interconnects contacts 150A and 150B.

Provision is made for an alarm relay 220 which is connected by lead 222 to the previously mentioned contact 196 associated with the ring contacts 134A, and by line 224 to the power supply 80. The relay 220 is provided with the movable contacts 226, 228, and 230 which are paired with the stationary contacts 232, 234 and 236 respectively. The movable contacts 226 and 228 are connected through the line 238 to the power supply 80 and the movable contact 230 is connected through the line 240 to a remote alarm hereinafter described in detail. The stationary contact 236 is also connected to said remote alarm through the line 242. The stationary contact 234 is connected through line 244 to the previously mentioned alarm lamp 12 and alarm buzzer 13 which are connected in parallel, one end of the parallel connection being connected to said line 244 and the other end being connected by line 246 to the power supply 80. The stationary contact 232 is connected by line 248 to the previously mentioned contact 194. The manual sweep arm 199 is connected by lines 250 and 238 to the power supply.

As previously indicated, in the home or "off" position, of the relay or counter 17, all of the count indicator lights 154, 160, 164, 168, 172, 176, 180, 184, 188 and 192 are off. Similarly in said "off" or home position of the counter, the contacts 194 and 196 are open.

Assuming now that the timing motor 21 has started a cycle of operation thereof so that the contacts 122 of the time switch are disengaged and signal voltage, having a distortion percentage above that present by the distortion threshold control 15, is applied to the gate diode 74, it will be apparent that the multivibrator 104 will be operated to pulse the relay 106 and close the latter for the duration of said pulse resulting in the pulsing of the step relay coil 108 of the counter 17 to move the sweep arms 128 and 130 from the home position thereof to engage the first of the associated contacts 141 and 141A. This results in the energization of the neon lamp indicator 154 to indicate a first count, the circuit through the lamp being completed through the sweep arm 128 which is grounded. Each successive energization of the stepping relay coil 108 results in the sequential energization of the lamps associated with the respective contacts on the ring 134, the previously energized lamp being extinguished as each following lamp is energized. By noting which lamp in the series, counting from the left viewing Fig. 1, is energized the number of distortion pulses which have been received during the current operating cycle of the timing motor 21 may be readily ascertained.

As previously indicated, the selector switch 19 is preset at a particular setting at which it is desired to energize an alarm for a predetermined number of distortion pulses in any one operating cycle of the timing motor 21. Assuming now that it is desired to energize the alarm when five distortion pulses have been received during any operation cycle of the timing motor 21, the selector sweep arm 199 is positioned to engage the fifth contact counting clockwise along the associated ring, and is positioned as indicated in Fig. 1. When the counter 17 has operated five times during a cycle of operation of the motor 21, the alarms 12 and 13 will be energized. More specifically, it will be noted that as soon as the sweep arm 130 moves to engage the first contact 141A the contacts 194 and 196 are closed and that these contacts remain closed until the sweep arm returns to its homing position. Consequently, when the sweep arm 130 has been moved or stepped five times and engages the contact 145A an energizing circuit for the relay 220 is established as follows: from the power supply through the leads 246 and 224 to one side of the relay 220, and from the other side of the relay 220 through the lead 222, the sweep arm 130 engaged with the contact segment 145A and through the lead 208 to the contact segment 145B engaged with the switch arm 199, and from the latter through the leads 250 and 238 to the other side of the power supply. The relay 220 being energized, the movable contacts 226, 228 and 230 thereof engage the companion stationary contacts. The engagement of the contacts 226 and 232 provide a holding circuit for the relay to retain the latter energized after the sweep arm 130 moves past the contact segment 145A. It will be noted that the relay is now connected to one side of the power supply through leads 246 and 224 as formerly, and to the other side of the power supply through lead 238, the engaged contacts 226—232, lead 248, the engaged contacts 194—196 and through lead 222 to the other side of the relay. The engagement of the relay contacts 228 and 234 complete the energizing circuit for the visual alarm 12 and for the audible alarm 13 which remain energized after the step relay is stepped to the following position thereof because of the previously described holding or stick circuit for the relay 220. In addition, the circuit through the remote alarm is completed by the engagement of the relay contacts 230, 236, and said remote alarm also remains energized during the subsequent stepping of the step relay 108.

A manual count switch 114 is utilized to provide a manual count. Each time that the switch is operated to the closed position thereof, the coil 108 of the stepping relay is pulsed to advance the relay.

At the termination of each cycle of operation of the timing motor 21, the contacts 122 of the timing motor switch 120 are closed by the engagement of a spring biased one of said contacts 122A into a notch 23 provided in a timing disc 25 operated by the motor 21. This completes the energization of the reset coil 116 to return the sweep arms 128 and 130 to the "off" position thereof whereby all of the indicator lamps controlled by the sweep arm 128 are de-energized, the relay 220 is de-energized, and the alarms 12, 13 and the remote alarm are all de-energized. The manual reset switch 118 may be utilized to manually energize the reset relay coil 116 so as to reset the sweep arms 128 and 130 to the home or starting position thereof, again automatically erasing all counts and opening the alarm circuits. Terminals 127 and 129 paralleling the switch 118 are provided so that the reset may be accomplished by a remote switch in parallel with switch 118.

The previously described telegraph monitoring apparatus 10 is a conventional apparatus for monitoring one telegraph loop circuit. However, where a plurality of telegraph lines are to be monitored, it is much more advantageous and economical to utilize one monitoring apparatus to monitor all of said lines rather than utilize a separate monitoring apparatus for each line. Pursuant to the present invention, provision is made for monitoring a plurality of separate telegraph lines with only a single monitoring apparatus 10. For example, and not by way of limitation, with the apparatus of the present invention, ten telegraph lines may be monitored in succession for three minutes each during a 30 minute interval during which provision is made to switch the monitor in sequence from one telegraph line to the next telegraph line. Such a switching apparatus, generally indicated by the reference numeral 260, is illustrated in Figure 3.

Referring now to Figure 3 in detail, there is shown a terminal board 262 provided with ten input circuits for connection to ten different telegraph loops, said input circuits being designated by the reference characters L1 through L10 respectively. Each input circuit includes a resistor across which the voltage to operate the oscillator 14, in Fig. 1 is developed by the signals of an associated telegraph loop patched to the input circuit across the terminals of the resistor thereof. In this connection, it will be understood that when the monitor 10 is to monitor a plurality of telegraph loops, rather than a single telegraph loop, the resistor 266 in the input circuit 11 the monitor 10 is removed therefrom and the resistors 264 in the input circuits L1 through L10 are connected in the respective telegraph loops which are to be monitored. For a twenty milliampere loop, a resistor 264 of one thousand ohms per loop is used. For a sixty milliampere loop, a resistance of approximately 335 ohms is used and this is obtained by paralleling a 510 ohm resistor (not illustrated) across the one thousand ohm resistor 264 so that, in either case, the voltage drop is approximately the same across the input resistor in each of the input circuits L1 through L10 to apply the same voltage to the monitor. The loop of each telegraph circuit is thus kept closed at all times by the resistor 264, it being understood, as previously indicated that each of the loops is connected to the terminals T1 and T2 associated with each of the resistors 264. Some loops may be 20 milliampere loops and other loops may be sixty milliampere loops, in each case the appropriate resistance 264 being used, and the monitor will operate uniformly when switched from one loop to the next. The input resistance to the oscillator 14 is relatively high so that when it parallels the input resistance 264, it produces a very small change in loop current as the monitor is switched from one loop to the next.

Provision is made for a second terminal board 268. The terminals T3 and T4 on the terminal board 268 are connected to the terminals of the input circuit 11 of the oscillator 14 of the monitor from which, as previously indicated, the resistor 266 has been removed. The terminals T5 and T6 on the terminal board 268 are connected to the leads 240 and 242 from the relay contacts 230—236 of the relay 220 for operating a remote alarm, as hereinafter described in detail. The terminals T7 and T8 of the terminal board are connected to the terminals 127 and 129 of the remote reset in Fig. 1. Terminal T9 is connected to the plus 48 volt tap of the power supply and terminal T10 is connected to the plus 150 volt tap of the power supply. Terminals T11 and T12 are connected to the 115 volt A. C. supply.

In order to connect the loop inputs L1 through L10, respectively, to the monitor apparatus 10, provision is made for a manual selector switch 270. As here shown, said switch includes the ganged manually operable arms 272 and 274. In the present construction, each of the arms is movable to eleven different positions for making contact with eleven different contacts, respectively. The contacts associated with contact arm 272 are indicated by the reference numerals 281 through 291, respectively, and the contacts associated with the sweep arm 274 are indicated by the reference numerals 301 through 311, respectively. Associated with the contacts 281 through 291, there is a contact ring having the contact segments 281A through 291A respectively, each of which is insulated from the other and each of which is connected to the similarly numbered contact associated with the sweep arm 272. A lead 312 interconnects the contacts 281 and 281A. Lead 314 interconnects contacts 282 and 282A. Lead 316 interconnects contacts 283 and 283A. Lead 318 interconnects contacts 284 and 284A. Leads 320 interconnect contacts 285 and 285A. Lead 322 interconnects contacts 286 and 286A. Lead 324 interconnects contacts 287 and 287A. Lead 326 interconnects contacts 288 and 288A. Lead 328 interconnects contacts 289 and 289A. Lead 330 interconnects contacts 290 and 290A.

Contact 281A is connected to one side of input circuit L1 through lead 332. Contact 282A is connected through lead 334 to one side of input circuit L2. Contact 283A is connected through lead 336 to one side of input circuit L3. Contact 284 is connected through lead 338 to one side of input circuit L4. Contact 285A is connected through lead 340 to one side of input circuit L5. Contact 286A is connected through lead 342 to one side of input circuit L6. Contact 287A is connected through lead 344 to one side of input circuit L7. Contact 288A is connected through lead 346 to one side of input circuit L8. Contact 289 is connected through lead 348 to one side of input circuit L9, and contact 290A is connected through lead 350 to one side of input circuit L10.

Referring now to the contacts associated with the sweep arm 274, provision is made for an associated contact ring having the contact segments 301A through 311A, each of which is insulated from the other. Contact 301 is connected to 301A by lead 352. Lead 354 interconnects contacts 302 and 302A. Lead 356 connects contacts 303 and 303A. Lead 358 interconnects contacts 304 and 304A. Lead 360 interconnects contacts 305 and 305A. Leads 362 interconnects contacts 306 and 306A. Lead 364 interconnects contacts 307 and 307A. Lead 366 interconnects contacts 308 and 308A. Lead 368 interconnects contacts 309 and 309A, and lead 370 interconnects contacts 310 and 310A. Contacts 291A and 311A are interconnected by lead 372.

Contacts 301A through 310A are also connected to the input circuits L1 through L10, respectively, at the sides of said input circuits opposite to which the contacts 281A through 291A are connected. More specifically, lead 374 interconnects contact 301A and input circuit L1. Lead 376 interconnects contact 302A and input circuit L2. Lead 370A interconnects contact 303A and input circuit L3. Lead 380 interconnects contact 304A and input circuit L4. Lead 382 interconnects contact 305A and input circuit L5. Lead 384 interconnects contact 306A and input circuit L6. Lead 386 interconnects contact 307A and input circuit L7. Lead 388 interconnects contact 308A and input circuit L8. Lead 390 interconnects contact 309A and input circuit L9 and lead 392 interconnects contact 310A and input circuit L10.

Provision is made for a stepping relay 394 which is provided with brush or wiper arms 396, 398, 400, 402 and 404, each of which moves along an associated ring of contacts. The relay 394 has no reset coil and is of the continuous stepping type causing its brush contacts to always move or rotate in the same direction. Brush 396 successively contacts the contact segments 282A through 291A in response to the stepping or pulsing of the relay 394, returning to engage the contact segment 281A after disengaging the contact segment 291A. In the same manner brush contact 398 engages the contact segments 301A through 311A in succession as the relay 394 is pulsed, the brush always rotating in the same direction so as to move from contact 311A back to contact 301A.

The selector arm 272 is connected through lead 406 to the terminal T3 on the terminal board 286 and the selector arm 274 is connected through lead 408 to the companion terminal T4. The first ten positions of said selector arms, wherein arm 272 is connected to one of the contacts 281 through 290, and arm 274 is connected to a corresponding one of the contacts 301 through 310, connects the oscillator 14 of the monitor 10 to the corresponding one of the telegraph loop input circuits L1 through L10, respectively. The eleventh position, wherein arm 272 engages contact 291 and arm 274 engages contact 311 is used for automatic operation for monitoring all of the contact loops rather than any one particular contact loop, and in this position, the monitor, through the terminals T3 and T4, is connected to the wiper contacts 396 and 398 of the stepping relay 394. In this connection it will be noted that the wiper contact arm 396 is connected by lead 410 to contact 291 and the wiper contact arm 398 is connected by lead 412 to the contact 311.

The coil of relay 394 is connected through leads 414 and 416 to the terminal T9 of the terminal board 268 so as to connect the relay coil to the 48 volt tap of the power supply. The energizing circuit for the relay coil 394 is completed when the other end of the coil is grounded and this occurs under the control of a timing motor 418. More specifically, motor 418 operates a normally open switch 420 having a movable contact 422 which is grounded at 424. The contact 422 rides on a cam 425 driven by the motor 418 and when the spring contact 422 engages in a notch 426 provided in the cam 425, the switch 420 is closed for energizing the relay 394. As here shown, the cycle of operation of the motor 418 is approximately three minutes so that every three minutes this motor closes the switch 420 for a few seconds, to step the stepping relay 394 so as to advance the brush contacts thereof one step.

A second relay 428 is also pulsed by operation of the timing motor 418. More specifically, it will be noted that relay 428 is connected through the lead 416 to the power terminal T9 on the terminal board 268 and is also connected to the timing switch 420. Consequently, the operation of said switch by the motor 418 completes the connection of the low voltage end of the coil 428 to ground to complete the energization thereof. Contacts 430 of relay 428 are connected through leads 432 and 434 to the remote reset terminals T7 and T8 of the terminal board 268, which, as previously indicated, are connected to the remote reset terminals 127—129 of the monitor apparatus 10. Consequently, it will be apparent that when motor 418 pulses the stepping relay 394 in the switching apparatus 260, the latter being in the automatic position thereof, to change the input circuit in the switching unit to which the monitor apparatus 10 is connected, the simultaneous energization of the relay 428 results in the pulsing of the reset relay coil 116 of the monitor apparatus to reset the stepping relay 17 to its "off" position and thereby to de-energize the alarms 12 and 13 in the monitor and also to erase the count by de-energizing the count indicator lamps in the monitor.

Provision is also made for a series of relays 436, 438, 440, 442, 444, 446, 448, 450, 452 and 454 each of which is connected at one end thereof through the leads 456 and 416 to the 48 volt tap of the power supply. At their other ends, each of these relays is connected to a contact segment of an additional contact ring of the stepping relay 394, with which the wiper contact 400 cooperates. More specifically, it will be noted that relay 436 is connected to contact segment 436A through the lead 458. Relay 438 is connected to contact segment 438A through lead 460. Relay 440 is connected to relay 440A through lead 462. Relay 442 is connected to contact 442A through lead 464. Relay 444 is connected to contact 444A through lead 466. Relay 446 is connected to contact 446A through lead 468. Relay 448 is connected to contact 448A through lead 470. Relay 450 is connected to contact 450A through lead 472. Relay 452 is connected to contact 452A through lead 474 and relay 454 is connected to contact 454A through lead 476.

Each of the relays 436 through 454 has a movable contact 478 which is grounded and a companion stationary contact 480 connected to the lead which runs to the corresponding one of the contact segments 436A through 454A. In addition, each of said relays has a second movable contact 482 which is connected by lead 484 to terminal T10 of the terminal board 268 which is connected to the plus 150 volt tap of the power supply in the monitor. Each movable contact 482 is engageable with a companion stationary contact 485 which is connected to one end of an alarm here shown as an indicator lamp. There are ten indicator lamps, one for each of the telegraph circuits being monitored. Indicator alarm lamp LA1 is associated with the input circuit L1, indicator lamp LA2 is associated with the input circuit L2. Indicator lamp LA3 is associated with the input circuit L3. Indicator lamp LA4 is associated with the input circuit L4. Indicator lamp LA5 is associated with the input circuit L5. Indicator lamp LA6 is associated with the input circuit L6. Indicator lamp LA7 is associated with the input circuit L7. Indicator lamp LA8 is associated with the input circuit L8. Indicator lamp LA9 is associated with the input circuit L9 and indicator lamp LA10 is associated with the input circuit L10. The other end of each of said indicator alarm lamps is grounded and therefore it will be apparent that when the corresponding contacts 482—485 are engaged the corresponding indicator alarm lamp is energized.

Assuming now that the selector switch 270 is in the automatic position and the various telegraph loop circuits are being scanned through operation of the stepping relay 394, as previously described, and while the monitor apparatus is connected to a particular telegraph line, the alarm devices 12 and 13 of the monitor are energized as previously described, it will be apparent that the circuit from the remote alarm terminals T5 and T6 on the terminal board 268 through the remote alarm leads 240—242 of the monitor will be completed. This will further complete a circuit extending from terminal T6 through lead 490 to the brush contact 400 engaged with one of the contacts 436A through 454A. The circuit will continue from the contact, with which the brush contact is engaged, through the associated one of the relays 436 through 454, respectively, to energize the latter. More specifically, this completes a circuit from one end of the associated relay to the plus 48 volt tap of the power supply connected to terminal T9 of the terminal board 268, and from the other end of the relay through the brush contact 400 to the terminal T6, through the leads 240 and 242 in the monitor unit, which are bridged by the engaged contacts 230—236, and back to ground at the terminal T5 of the terminal board 268. The relay being energized, its contacts 482—485 are engaged to light the associated alarm lamp LA1 through LA10. The second set of relay contacts 478—480 are also closed and grounds the relay coil so that when the stepping relay 394 has advanced its various brush contacts to the next position for monitoring the next telegraph line channel, whereby to remove the alarm from the monitor itself by operation of the reset relay 428 to step the reset coil 116 in the monitor, the energized alarm light in the monitor switching unit itself, which corresponds to the telegraph line which had caused the alarm remains energized, the light remaining on.

A push-button reset switch 492 has one section connected in the line 456 so that when said switch is operated to open the line 456, all of the relays 436 through 454 are disconnected from the plus 48 volt supply in the monitor so as to extinguish the energized warning lamp LA1 through LA10. A second section 494 of the switch 492 is connected across the lines 432 and 434 which run through the reset terminals T7 and T8 of the terminal board 268. Consequently, when the push button 492 is depressed, the lines are shorted and ground one end of the reset coil 116 in the monitor for resetting the count relay 17 of the latter to the "off" position thereof.

Provision is made for a second set of indicator lamps designated by the reference numerals LA11 through LA20 to indicate which telegraph line or loop is being monitored at any given time. It will be understood that the lamps LA11 through LA20 differ in color from the lamps LA1 through LA10. Lamps LA1 through LA10, being used as alarm indicators, are preferably colored red whereas the lamps LA11 through LA20 are preferably colored white. At one end thereof, each of the lamps LA11 through LA20 is connected through line 496 to the plus 150 volt tap of the power supply 80 in the monitor 10. The lamps LA11 through LA20 are connected at the other ends thereof to the contacts 511 through 520, respectively, of the ring associated with the wiper contact 402 of the stepping relay 394. More particularly, lamp LA11 is connected through lead 522 to contact 511. Lamp LA12 is connected through lead 524 to contact 512. Lamp LA13 is connected through lead 526 to contact 513. Lamp LA14 is connected through lead 528 through contact 514. Lamp LA15 is connected through lead 530 to contact 515. Lamp LA16 is connected through lead 532 to contact 516. Lamp LA17 is connected through lead 534 to contact 517. Lamp LA18 is connected through lead 536 to contact 518. Lamp LA19 is connected through lead 538 to contact 519 and lamp LA20 is connected by lead 540 to contact 520. It will be understood that the alarm indicator lamps LA1 through LA10 are positioned on the panel of switching unit 260 adjacent the corresponding channel indicator lamps LA11 through LA20. It will be noted that the brush contact 402 is grounded as at 542 so that as the brush engages each of the contacts 511 through 520 it completes a circuit through the associated one of the channel indicator lamps LA11 through LA20 from the 150 volt tap of the power supply to energize said lamp.

Pursuant to the present invention, provision is also made to provide for the monitoring of any number of telegraph channels less than the ten channels herein illustrated, for example and not by limitation, provision is made pursuant to the present invention of giving the three minute timing intervals to any successive number of channels from two to ten. In this connection, provision is made for a channel scanning switch 550. As here shown, the switch 550 has an arcuate shorting bar 551 which is grounded as at 544. The shorting bar 551 is in sliding engagement with a contact strip 552 having contact segments 553, 554, 555, 556, 557, 558, 559 and 560 which are electrically insulated from each other. The contact segments 553 through 560 are electrically connected to the contact segments 553A to 560A, respectively, of the contact ring of the stepping relay 394 which is associated with the wiper contact 404 thereof. More specifically, lead 562 interconnects contacts 553 and 553A. lead 564 interconnects contacts 554 and 554A. Lead 566 interconnects contacts 555 and 555A. Lead 568 interconnects contacts 556 and 556A. Lead 570 interconnects contacts 557 and 557A. Lead 572 interconnects contacts 558 and 558A. Lead 574 interconnects contacts 559 and 559A and lead 576 interconnects contacts 560 and 560A. Brush 404 is connected by lead 578 to the movable contact 580 of the stepping relay 394. Said movable contact 580 operates between the stationary contacts 582 and 584, the relay 394 also having a kicker arm 586 which, upon energization of the relay 394 kicks the contact 580 from engagement with contact 582 to engagement with contact 584. When the channel scanning switch 550 is in the illustrated position thereof, wherein the contacts 553 through 560 thereof are shorted by the shorting member 551, the telegraph channels or loop circuits connected to the input circuits L1 and L2 will be scanned alternately. In the next position of the scanning switch 550 wherein contacts 554 through 560 are shorted in the switch, the three telegraph channels connected to inputs L1, L2 and L3 will be scanned alternately. Similarly, when the contacts 555 through 560 are shorted, four telegraph channels will be scanned alternately. Therefore, it will be apparent that by progressive movement of the shorting bar 551 in the direction of the arrow 590 the number of telegraph channels to be alternately scanned may be increased.

As previously indicated, the wiper arms or contacts of the stepping relay 394 always rotate in a circle in the same direction so that when a particular wiper has moved to the very last contact on the associated contact ring, its next step is to the first contact in the same ring, which step is in the same direction of movement as the previous steps. Assuming now that the channel scanning switch 550 is in the illustrated position thereof wherein contacts 553A through 560A of the contact ring associated with the wiper arm 404 are grounded by the scanning switch 550, since the grounded shorting bar 551 thereof has shorted and grounded the corresponding contacts 553 through 560, the stepping relay 394 will monitor for three minutes each the telegraph channels connected to the inputs L1 and L2.

As previously explained, the relay 394 is stepped by operation of the timing motor 418 which closes the switch 420 to complete the energizing circuit to the coil of relay 394. However, when the relay has been stepped to its third position for monitoring the telegraph channel connected to the input L3 and wherein the various brushes of the step relay 394 are in engagement with the third contact of the associated contact rings counting from the right to the left in Fig. 3, a circuit is completed through the coil of relay 394 as follows: From the terminal T9 of the terminal board 268, which is connected to the plus 48 volt tap of the power supply, through the leads 416 and 414 to one side of the coil of relay 394, through the coil and from the other side thereof through lead 592, the engaged contacts 582 and 580 through lead 578, the brush contact 404 engaged with contact 553A, through lead 562 to contact 553 which is grounded by the shorting bar 551. This completes a circuit for energizing the coil of stepping relay 394 and steps said relay to the next position thereof wherein the brushes thereof move to the following contact on the various contact rings. Said energization of the relay 394 also causes the armature arm 586 thereof to move contact 580 out of engagement with contact 582 and to engage contact 584. The disengagement of contact 580 from contact 582 interrupts the energizing circuit for the relay 394 and contact 580 then swings back to engage contact 582. However, the brushes having stepped to the next position, and the next contact 554A engaged by brush 404 being grounded through its associated contact 554 on the channel scanning switch 550, the relay 394 is again energized through the described circuit and the brushes are again advanced, the kicker arm 586 again disengaging the contact arm 580 from contact 582 and 580 re-engaging 582 upon de-energization of the relay 394. However, since the remaining contacts on the selector switch 550 are grounded, the contact 580 of the relay operates in conjunction with the kicker arm 586 thereof like a vibrator, stepping the relay 394 rapidly to successive positions with each cycle of the vibration of the member 580 until the brush 404 thereof engages a contact which is not grounded. When this occurs, the relay 394 can be pulsed and operated only through the operation of the timing motor 418.

Since the selector switch 550 can progressively remove its contacts from ground as it is moved in the direction of the arrow 590, it provides the option of giving the three minute timing interval cycle of the timing motor 418 to any successive number of monitor telegraph channels from 2 to 10 in the nine positions of the scanning switch 550. In this connection, it will be noted that the scanning switch is illustrated in its second position, its first position being one step in a counterclockwise movement wherein the shorting bar 551 will engage the contact to the left of the contact 553.

It will be readily understood that various different timing intervals for monitoring the various telegraph channels may be readily provided by changing the timing cycle of the motor 418. In this connection, it will be understood that motor timers can be obtained to provide operating intervals from a few seconds to many hours. Further, it will be apparent that additional telegraph circuits than the ten illustrated herein, may be monitored by utilizing a stepping relay 394 having provision for a greater number of steps than that illustrated herein.

Provision is made for rectifier 594 connected to line 416 to suppress pulses on the 48 volt power supply line produced by operation of the relay coil. The filter constituted by the capacitor 598 and the resistor 596 in line 414 serve the same function.

It will be noted that when the monitor switching device 260 is used in connection with the telegraph monitoring apparatus 10, the timing motor 21 in the telegraph monitoring apparatus is not used. The timing motor 418 and the switch 420 of the switching apparatus 260 perform the normal reset function for resetting the monitor 10 as well as for stepping the relay 394 for scanning the various telegraph channels being monitored.

The motor 418 is connected to the alternating current supply through leads 600 and 602 to terminals T11 and T12. An on-off switch 604 is connected in the leads. A pilot light 606 is connected across these leads to indicate the operating condition of motor 418.

While I have shown and described the preferred embodiments of my invention, it will be understood that various changes may be made in the idea or principles of the invention within the scope of the appended claims.

Having thus described my invention, what I claim and desire to secure by Letters Patent, is:

1. Apparatus of the character described comprising means for monitoring the distortion present in a telegraph loop circuit, said monitoring means having distortion-count means and alarm means energized upon the occurrence of a predetermined distortion count, a plurality of input circuits adapted to be connected in a plurality of telegraph loops, respectively, a similar plurality of alarm devices, time-controlled means to electrically connect said input circuits individually at predetermined intervals in continuous succession to said monitoring means for monitoring in said continuous succession the associated telegraph loops, respectively, and said time-controlled means having provision to simultaneously electrically connect said alarm devices individually in circuit with said distortion-count means in said continuous succession, whereby to energize the associated alarm device for the input circuit electrically connected to said monitoring means if said predetermined count is reached.

2. Apparatus of the character described comprising means for monitoring the distortion present in a telegraph loop circuit, said monitoring means having distortion-count means and alarm means energized upon the occurrence of a predetermined distortion count, a plurality of input circuits adapted to be connected in a plurality of telegraph loops, respectively, a similar plurality of alarm devices, time-controlled means to electrically connect said input circuits individually at predetermined intervals in continuous succession to said monitoring means for monitoring in said continuous succession the associated telegraph loops, respectively, and said time-controlled means having provision to simultaneously electrically connect said alarm devices individually in circuit with said distortion-count means in said continuous succession, whereby to energize the associated alarm device for the input circuit electrically connected to said monitoring means if said predetermined count is reached, and means to retain the energized alarm device in energized condition after its associated input circuit is disconnected from said monitoring means.

3. Apparatus of the character described comprising means for monitoring the distortion present in a telegraph loop circuit, said monitoring means having distortion-count means and alarm means energized upon the occurrence of a predetermined distortion count, a plurality of input circuits adapted to be connected in a plurality of telegraph loops, respectively, a similar plurality of alarm devices, time-controlled means to electrically connect said input circuits individually at predetermined intervals in continuous succession to said monitoring means for monitoring in said continuous succession the associated telegraph loops, respectively, and said time-controlled means having provision to simultaneously electrically connect said alarm devices individually in circuit with said distortion-count means in said continuous succession, whereby to energize the associated alarm device for the input circuit electrically connected to said monitoring means if said predetermined count is reached, and a similar plurality of indicator devices associated with said input circuits respectively, and said time-controlled means having provision to simultaneously effect the energization of said indicator devices in said continuous succession, whereby to identify the telegraph loop being monitored during each of said predetermined intervals.

4. Apparatus of the character described comprising means for monitoring the distortion present in a telegraph loop circuit, said monitoring means having distortion-count means and alarm means energized upon the occurrence of a predetermined distortion count, a plurality of input circuits adapted to be connected in a plurality of telegraph loops, respectively, a similar plurality of alarm devices, time-controlled means to electrically connect said input circuits individually at predetermined intervals in continuous succession to said monitoring means for monitoring in said continuous succession the associated telegraph loops, respectively, and said time-controlled means having provision to simultaneously electrically connect said alarm devices individually in circuit with said distortion-count means in said continuous succession, whereby to energize the associated alarm device for the input circuit electrically connected to said monitoring means if said predetermined count is reached, and selector means operable in conjunction with said time controlled means to electrically connect to said monitoring means certain only of said input circuits individually and in continuous succession at said predetermined intervals.

5. Apparatus of the character described comprising means for monitoring the distortion present in a telegraph loop circuit, said monitoring means having distortion-count means and alarm means energized upon the occurrence of a predetermined distortion count, a plurality of input circuits adapted to be connected in a plurality of telegraph loops, respectively, a similar plurality of alarm devices, time-controlled means to electrically connect said input circuits individually at predetermined intervals in continuous succession to said monitoring means for monitoring in said continuous succession the associated telegraph loops, respectively, and said time-controlled means having provision to simultaneously electrically connect said alarm devices individually in circuit with said distortion-count means in said continuous succession, whereby to energize the associated alarm device for the input circuit electrically connected to said monitoring means if said predetermined count is reached, and means to retain the energized alarm device in energized condition after its associated input circuit is disconnected from said monitoring means, and means operable to reset said count means to the starting condition thereof and to de-energize said energized alarm device.

6. A switching unit for a telegraph distortion-monitoring apparatus having distortion count means, said unit having a plurality of input circuits for connection in a similar plurality of telegraph loops, respectively, step-relay means having a first and a second series of contacts connected in paired sets to said input circuits, respectively, first and second wiper contacts operable along said first and second series of contacts for connecting said input circuits individually in continuous succession to the input of said monitoring apparatus, a third series of contacts and a third wiper contact operable therealong for electrically connecting said third series of contacts individually in continuous succession in circuit with said count means, a series of alarm devices in circuit with said third series of contacts, respectively, for energization upon the occurrence of a predetermined count while its associated contact in said third series is in circuit with said count means, and time-control means for energizing said step-relay means at predetermined intervals to step said wiper contacts along their associated contact series.

7. A switching unit as defined in claim 6, further characterized in the provision of means for retaining an energized alarm device in energized condition after its associatde contact is disengaged by the associated wiper contact.

8. A switching unit as defined in claim 6, further characterized in that the step-relay is provided with a fourth series of contacts and a fourth wiper contact operable therealong, and provision is made for a series of indicator devices electrically connected to said fourth series of contacts, respectively, and said fourth wiper contact having provision to complete an energizing circuit through said indicator devices during the interval that it enegages the respective one of said fourth series of contacts, whereby to provide an indication of the particular telegraph loop which is connected through said relay to the monitoring apparatus.

References Cited in the file of this patent

UNITED STATES PATENTS

| | | |
|---|---|---|
| 2,304,120 | Potts | Dec. 8, 1942 |
| 2,452,344 | Addorisio | Oct. 26, 1948 |
| 2,515,677 | Usselman | July 18, 1950 |
| 2,528,744 | Fehr | Nov. 7, 1950 |
| 2,573,718 | Kleinschmidt | Nov. 6, 1951 |
| 2,696,604 | Markow et al. | Dec. 7, 1954 |
| 2,752,589 | De Long | June 26, 1956 |